(12) United States Patent
Daniel

(10) Patent No.: US 9,185,084 B1
(45) Date of Patent: Nov. 10, 2015

(54) SYSTEM AND METHOD OF MAINTAINING PRIVATE COMMUNICATIONS USING CODED MESSAGES

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 165 days.

(21) Appl. No.: 13/952,237

(22) Filed: Jul. 26, 2013

Related U.S. Application Data

(63) Continuation-in-part of application No. 13/562,161, filed on Jul. 30, 2012, now Pat. No. 8,874,089, and a continuation-in-part of application No. 13/532,615, filed on Jun. 25, 2012, and a continuation-in-part of application No. 13/682,676, filed on Nov. 20, 2012, and a continuation-in-part of application No. 13/725,830, filed on Dec. 21, 2012, now Pat. No. 8,965,425, and a continuation-in-part of application No. 13/935,740, filed on Jul. 5, 2013.

(60) Provisional application No. 61/676,272, filed on Jul. 26, 2012.

(51) Int. Cl.
*H04L 29/06* (2006.01)

(52) U.S. Cl.
CPC ................ *H04L 63/0428* (2013.01)

(58) Field of Classification Search
CPC .... H04W 4/12; H04L 51/38; H04M 1/72555; H04M 3/42
See application file for complete search history.

(56) References Cited

U.S. PATENT DOCUMENTS

| | | | |
|---|---|---|---|
| 2006/0212818 A1* | 9/2006 | Lee | 715/753 |
| 2008/0216022 A1* | 9/2008 | Lorch et al. | 715/847 |
| 2013/0231143 A1* | 9/2013 | Erskine et al. | 455/466 |

* cited by examiner

*Primary Examiner* — Kashif Siddiqui
(74) *Attorney, Agent, or Firm* — Carol N. Green Kaul, Esq.

(57) ABSTRACT

The present invention relates generally to a system and method of maintaining private communications using coded messages using an application program configured for activating privacy controls for intercepting electronic transmissions, e.g. text messages, for controlling how they are displayed upon receipt of a selection of a coded icon corresponding to a decoded message, wherein the application program converts the selected coded icon into the decoded message that is converted into cryptic text for display while the text message is being created for transmission, thereby maintaining the privacy of the communications. The cryptic text is again converted into the decoded message for transmission such that the recipient receives the message in decoded format. If the recipient's communication device is configured with the application program, upon receipt of the decoded message it is intercepted and will be displayed as cryptic text until read or reviewed by the intended recipient.

21 Claims, 7 Drawing Sheets

SYSTEM AND METHOD OF MAINTAINING PRIVATE COMMUNICATIONS USING CODED MESSAGES

PRIORITY CLAIM

This patent application is a continuation in part of, and claims priority to U.S. Provisional Patent Application Ser. No. 61/676,272 titled "System & Method of Transmitting Coded Messages and Delivering Targeted Advertisements" filed Jul. 26, 2012; U.S. Non-Provisional application Ser. No. 13/562,161 titled "System & Method Of Posting A Video Map Location On A Social Network" filed Jul. 20, 2012; U.S. Non-Provisional application Ser. No. 13/532,615 titled "Apparatus, System And Method For Transmitting Decoded Messages Electronically" filed on Jun. 25, 2012; U.S. Non-Provisional application Ser. No. 13/682,676 titled "Method of Transmitting Decoded Messages And Providing for Calendaring Responses" filed Nov. 20, 2012; U.S. Non-Provisional patent application Ser. No. 13/725,830 titled "System & Method of Transmitting Coded Messages Using Programmable Icons" filed Dec. 21, 2012; and United States Continuation In Part application Ser. No. 13/935,740 titled "System & Method of Transmitting Decoded Messages On Social Networks" filed Jul. 5, 2013. The entire disclosures of the aforementioned applications are incorporated by reference as if fully stated herein.

FIELD OF THE INVENTION

The present invention relates generally to a system and method of maintaining private communications using coded messages using an application program configured for activating privacy controls for intercepting electronic transmissions, e.g. text messages, for controlling how they are displayed upon receipt of a selection of a coded icon corresponding to a decoded message, wherein the application program converts the selected coded icon into the decoded message that is converted into cryptic text for display while the text message is being created for transmission, thereby maintaining the privacy of the communications. The cryptic text is again converted into the decoded message for transmission such that the recipient receives the message in decoded format. If the recipient's communication device is configured with the application program, upon receipt of the decoded message it is intercepted and will be displayed as cryptic text until read or reviewed by the intended recipient.

DESCRIPTION OF THE PRIOR ART

Communicating using mobile communication devices is now the norm and users generally feel constrained to transmit, or respond to text messages in public locations, e.g. restaurants, train stations, and the like. Except curious eyes and unintended recipients of the text messages have little qualms in viewing other people's text messages when they are being typed or the notification shows up on a phone that may be lying in public view. The excuse being that the recipient or sender has little or no expectation of privacy when texting or receiving text messages in a public forum. Although the rationale seems plausible, the reality is that most people expect their text transmissions to be private and discrete and certainly not for public viewing. Thus it would be advantageous and useful if the text messages or a social network posting remained a private communication between the sender and the intended recipient(s).

This invention satisfies these long felt needs in a new and novel manner and solves the foregoing problems that the prior art has been unable to resolve.

SUMMARY

A primary object of the present invention is to provide a system and method of transmitting coded messages using a mobile communication device that overcomes the limitations of the prior art.

Another object of the present invention is to provide a system and method for posting short coded messages via mobile communication devices using pre-programmed and/or programmable buttons from a virtual keyboard or a list of icons.

Yet another object of the invention is to provide the means for users to customize a decoded message for a particular icon.

Still yet another object of the present invention is to provide a system and method for activating a privacy element such that as the user selects the icons and/or the corresponding meanings for the icons, the displayed text is disguised from public view and is converted to for example, cryptic text, i.e. alphanumeric characters that are not necessarily translatable to a particular language, e.g. gibberish.

Another object of the present invention is to provide a system and method whereby a message recipient may receive for example a text message, which is displayed as cryptic text in the mobile phone's dormant mode for missed messages but once the text message is being actively viewed, the text message either displays the icons or converts the cryptic text to icons or a spoken language, e.g. English, Spanish, and the like.

An object of the present invention is to provide a system and method wherein appended to the text messages received are system icons, representative of various industries for targeted advertisements using data mining techniques and technology.

Still yet another object of the invention is to allow users to customize the short messages to communicate in a language of their own choice.

For a further and more fully detailed understanding of the present invention, various objects and advantages thereof, reference is made to the following detailed description and the accompanying drawings.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1A:
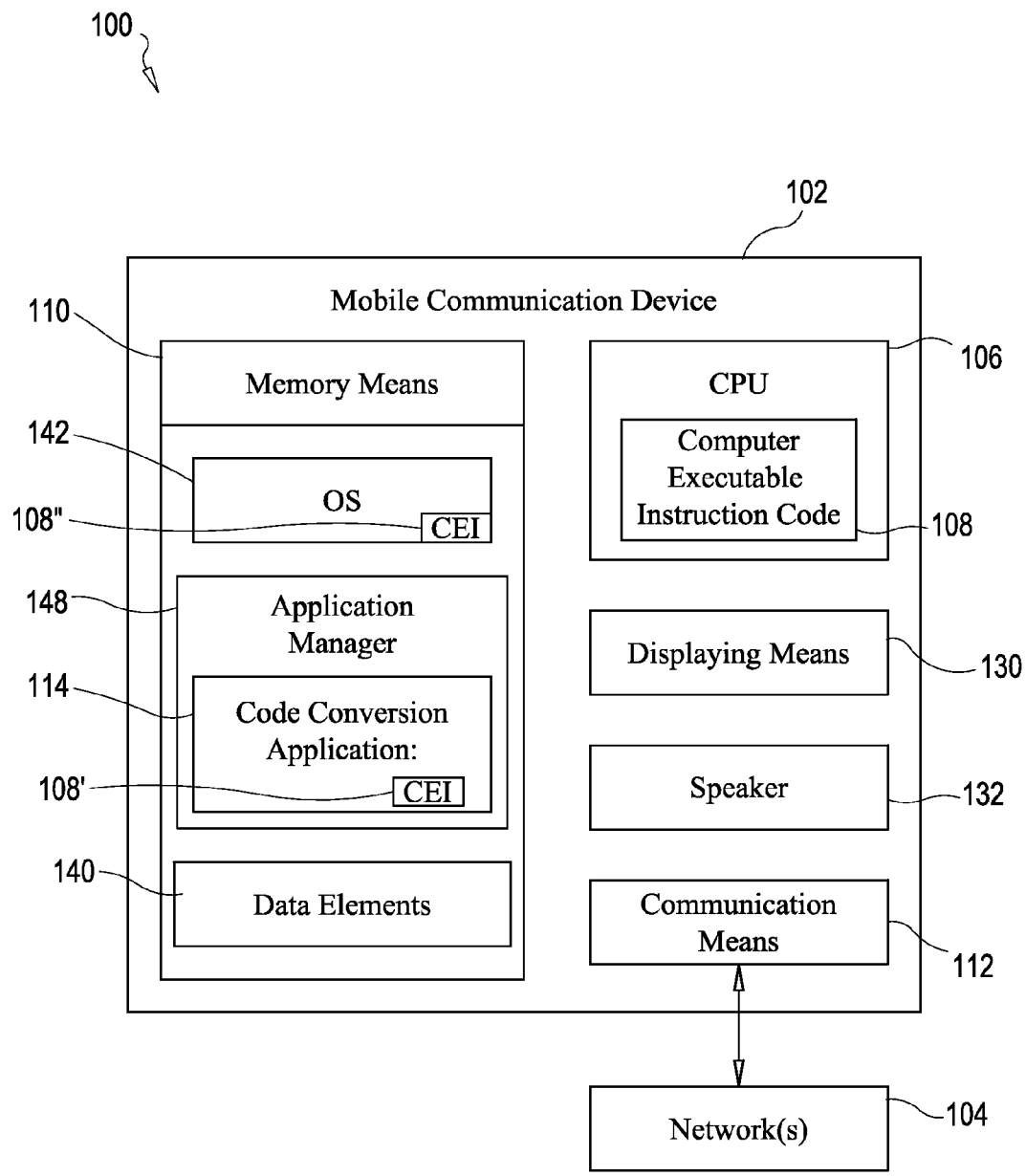
FIGS. 1A & 1B are exemplary embodiments of the system according to one embodiment.

The following discussion describes in detail an embodiment of the various system and methods for maintaining private communications as described below. However, this discussion should not be construed, as limiting the invention to those particular embodiments, as practitioners skilled in the art will appreciate that the system and method may vary as to configuration and as to details of the components, and that a method may vary as to the specific steps and sequence, without departing from the basic concepts as disclosed herein. Similarly, the elements described herein may be implemented separately, or in various combinations without departing from the teachings of the present invention. For a definition of the complete scope of the invention, the reader is directed to the appended claims. Turning now descriptively to the drawings, in which similar reference characters denote similar elements throughout the several views.

FIG. 1A is an illustrative view of the system 100 according to one embodiment of the present invention. System 100 includes an exemplary first mobile communication device 102, which includes any type of a network enabled computer device configured with means for communicating wirelessly and/or wired with a second, or a plurality of mobile communication devices 102", such as but not limited to, cellular phones (e.g., an iPhone, Android, Palm, Blackberry, or any "smart phone" as are generally known and used in the arts), location-aware portable phones (such as GPS), a personal computer, server computer, or laptop, or netbook computer, a personal digital assistant ("PDA") such as a Palm-based device or Windows CE device, a laptop computer, a tablet, personal computer, a portable screen, a portable processing device and/or any other portable device capable of communicating wirelessly over a computer network 104, i.e. local area network, wide area network such as the Internet, or any other type of network device that may communicate over a network 104.

Mobile communication device 102 may include various hardware components positioned within, e.g. a computer processor 106 comprising computer executable instruction code 108, memory means 110, and one or more communication means 112. Computer processor 106 may be any type of processor, such as, but not limited to, a central processing unit (CPU), a microprocessor, a video processor, a front end processor, a coprocessor, a single-core processor, a multi-core processor, as well as any known computer processor 106 that's used in the arts. Computer processor 106 may be programmed to activate an application program 114, i.e. a code conversion application ("app") program 114 also comprising computer executable instruction code 108' readable by the computer processor 106 and configured for inter alia activating privacy controls 116, 116' for messages being transmitted to a second, third, or a plurality of mobile communication devices 102' or a social network 118, wherein the code conversion app 114 is configured for receiving a selection 120 of at least one or more coded icons 122, 122' from either a virtual keyboard 124 or a list 126 of a plurality of icons 122, 122', or editing the decoded message 128 corresponding to the at least one icon 122 that may be displayed on the mobile communication device's displaying means 130.

Mobile communication device 102 also includes a speaker 132 for publishing the decoded messages 128, 128' or the various functions being performed herein in audio. Speaker 132 may be any kind of speaker that is well known and used in the arts.

Computer processor 106 is housed within the mobile communication device 102 and includes computer executable instruction code 108, where the computer executable instruction code 108 is operative to perform all the necessary functions for the system 100 and methods disclosed herein, including but not limited to launching the code conversion app 114.

Computer executable instruction code 108 may be loaded directly on the mobile communication device's processor 106, or may be stored in the mobile communication device's memory means 110 such as, computer readable media that includes but is not limited to, a hard drive, a solid state drive, a flash memory, random access memory, CD-ROM, CD-R, CD-RW, DVD-ROM, DVD-R, DVD-RW, and the like. Computer executable instruction code 108 may be any type of computer executable instruction code 108, which may be in the form of a computer program, the program being composed in any suitable programming language or source code, such as C++, C, JAVA, JavaScript, HTML, XML, and other programming languages.

Computer executable instruction code 108 is operative to perform any and all the necessary functions for the system 100 and methods disclosed herein, which may include any one or more of the following: launch the code conversion app 114, which also comprises computer executable instruction code 108' readable by the mobile communication device's computer processor 106 and configured for performing any one or more of the following: activating privacy controls 116, 116' for intercepting both incoming and outgoing electronic Short Message Service ("SMS") transmissions 134 for controlling the display of the SMS transmissions 134; receiving a selection 120 of the at least one coded icon 122 corresponding to at least one decoded message 128; converting the selected at least one coded icon 122 into the at least one decoded message 128; converting the at least one decoded message 128 into cryptic text 136 for display while the SMS transmission 134 in its entirety is being created in its entirety prior to transmission to the intended recipient, i.e. another mobile communication device 102' or a social network 118 feed; converting the cryptic text 136 into the decoded message 128 for transmission to a second mobile communication device 102' or a social network 118; displaying the cryptic text 136 on the first mobile communication device displaying means 130 once the decoded message 128 has been transmitted; transmitting the at least one decoded message 128 to any one or more for the following: a second mobile communication device 102' or a social network 118; receiving the transmitted at least one decoded message 128; converting the received decoded message 128 into cryptic text 136 for display on the second mobile communication device's displaying means 130' in dormant/sleep mode, i.e. prior to active viewing of the decoded message 128 on the second mobile communication device's where it is configured with the code conversion app 114; displaying the cryptic text 136 on the second mobile communication device's displaying means 130' upon receipt of the decoded message 128 prior to active viewing of the decoded message 128 as well as in the dormant/sleep mode post viewing; converting the cryptic text 136 into the at least one coded icon 122 for active viewing; converting the cryptic text 136 into the decoded message 128 for active viewing.

In some embodiments, code conversion application program's computer executable instruction code 108' is configured for displaying the cryptic text 136 on the network enabled mobile communication device's displaying means 130, which maintains the privacy of the electronic communications; transmitting the decoded message 128 to any one or more for the following: another mobile communication device 102' or the social network 118, where the receiving mobile communication device 102' receives the transmitted decoded message 128'. If the receiving mobile communication device 102' is configured with the code convertor app 114', the code convertor app's computer executable instruction code 108' is configured for converting the received decoded message 128' into cryptic text 136' for display on the recipient's network enabled communication device 102' in dormant mode; displaying the cryptic text 136 on the second mobile communication device's displaying means 130 upon receipt of the decoded message 128 prior to the recipient actively viewing the decoded message 128'; converting the cryptic text 136 into the at least one icon 122 or decoded message 128 for active viewing; and displaying a virtual touch-screen keyboard 124 that comprises a plurality of coded icons 122, 122' that correspond to decoded messages 128, 128', wherein the virtual touch-screen keyboard 124 is configured for receiving the selection of at least one icon 122 from the plurality of coded icons 114 corresponding to the decoded messages 128, 128', and/or the like.

Displaying means 130 may include any kind of displaying means 130, such as, but not limited to: a liquid crystal display ("LCD") screen, a light emitting diode ("LED") display, touchpad or touch screen display, and/or any other means known in the arts for emitting a visually perceptible output. Mobile communication device's processor 106 is in electronic communication with its displaying means 130. In other embodiments, displaying means 130 is wirelessly connected to processor 106. Displaying means 130 may include control means, such as, but not limited to, a touch screen, selecting using a pointing device, roller ball, arrow keys, a stylus or any other control means used in the arts. In some embodiments, displaying means 130 may be electronically connected to a mobile communication device 102 according to the hardware and software protocols that are known and used in the arts. Processor 106 controls the mobile communication device's displaying means 130, which is configured for displaying the converted icon's decoded message 128 on the at least one displaying means 130; displaying confirmation of transmission of the decoded message 128; and/or displaying a link 138 reference to the decoded message 128 as posted on the social network 118 and the like.

Mobile communication device 102 also includes communication means 112 for transmitting or receiving decoded messages 128, 128' to/from a second, a third, or more mobile communication devices 102', 102" or even from a social network 118. Social network 118 as used herein describes an online social construct of a community of people with common interests who use a website or other technologies to communicate with each other and share information, or resources.

If the mobile communication device 102' that is receiving the incoming SMS transmission 134 has the code conversion app 114, upon receipt of the decoded message 128, code conversion app 114 intercepts the incoming electronic SMS transmission 134, controls the display of the decoded message 128 such that the decoded message 128 is converted to cryptic text 136, and displayed as cryptic text 136 while the mobile communication device 102' is in dormant mode so that unintended recipients are unable to view the incoming SMS transmission 134. Privacy is similarly maintained by the transmitting mobile communication device 102 as once the decoded message 128 has been transmitted, the decoded message 128 is converted into cryptic text 136 or coded icons 122, 122' once the mobile communication device 102 enters dormant mode. Where the decoded message 128 is converted into coded icons 122, 122', unless the viewer knows the meanings/translation of the coded icons 122, 122', the coded icons 122, 122' remain private and are undecipherable.

If the mobile communication device 102' that is receiving the incoming SMS transmission 134 does not have the code conversion app 114, upon receipt of the decoded message 128, the SMS transmission 134 will display the decoded message 128 as received.

Communication means 112 is electronically connected to the computer processor 106. In the case of electronic connections, the electronic connections may be wired and/or wireless. In some embodiments, communication means 112 may be a wireless communication means 112, which employ short range wireless protocol, such as, but not limited to, a radio frequency transceiver with integrated radio and shared antenna, a radio frequency receiver, and/or a radio frequency transmitter. In embodiments where the wireless communication means 112 is a radio frequency receiver, the radio frequency receiver may be any type of radio frequency receiver, including, but not limited to, a positioning system receiver, such as a Global Positioning System receiver and a local positioning system receiver, such as a Wi-Fi positioning system receiver. In other embodiments, the communication means 112 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 112 are operative to transmit or receive electronic communications, i.e. data, text, pictures, video, streaming data and the like via a short range wireless protocol, such as, but not limited to, a radio frequency receiver, a radio frequency transmitter, or a radio frequency transceiver. In some embodiments, communication means 112 are in mating engagement with an autonomous power source, e.g. a rechargeable battery.

Mobile communication device 102 may include one or more memory means 110 electronically connected to the at least one computer processor 106. In the case of electronic connections, the electronic connections may be wired and/or wireless connections. Memory means 110 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 110 may be used to store information, such as the specific social network 118 linked to the user; decoded messages 128, 128' associated with particular icons 122, 122', customized decoded message 128, 128' associated with any one or more icons 122, 122' and the like some of which may be stored in data elements 140.

Stored information may be retrieved from memory means 110 using the computer processor 106.

Mobile communication device 102 also includes software components, e.g. an operating system ("OS") 142 that manages the hardware resources and other software components, by scheduling the various tasks to be accomplished by the processor 106 or input and output and memory allocation in the memory means 110 and the like. OS 142 acts as an intermediary between programs and the hardware components, and comprises of computer executable instruction code 108" to accomplish the various scheduling tasks. OS 142 may comprise of any one of the following operating systems, that may include but is not limited to ANDROID, BSD, IOS, GNU/LINUX, MAC OS X, MICROSOFT WINDOWS, WINDOWS PHONE, and IBM z/OS. In the exemplary mobile communication device 102, OS 142 resides in the memory means 110 as shown in FIG. 1A.

System 100 further comprises of software components, e.g. the code conversion app 114. Code conversion app 114 may be any type of software application, such as a standalone application designed to run on a mobile platform, including an OS 142, such as IOS™, ANDROID™, WINDOWS MOBILE™, BLACKBERRY™, and the like. Code conversion app 114 may be operative for an iPhone, other "smart phones", mobile communication devices, cellular phones, PDAs, GPS or any other mobile communication devices 102' capable of handling transactions dealing with dynamic content, object, application, or software.

In some embodiments, the code conversion app 114 may be designed to run on a social network platform, e.g. FACEBOOK®, TWITTER® or JUSTSYNC®, wherein user may post coded icons 122, 122' or decoded messages 128, 128' thereon for intended recipients to view. Activities, searches, viewing patterns and habits on the code conversion app's social network 118 yield collectible data concerning the user's preferences, and as such embedded links 138 to targeted advertising offers 144 may be appended to the decoded message 128 as an icon 122. For example the decoded message 128 may also include an icon 122, e.g. "E", for "Entertainment," which when clicked links to targeted entertainment advertising offers 144.

In some embodiments, code conversion app 114 may reside on a server computer 146 (not shown) where the code conversion app 114 may be downloadable to the mobile communication device 102 from the server computer 146 (not shown). As such, user may customize the coded icons 122, 122' (e.g. modifying the corresponding decoded messages 128, 128' associated with specific icons 122, 122') remotely from the mobile communication device 102 where the information is synchronized in realtime or shortly thereafter. Code conversion app 114 may comprise in part of a browser, such as for use on the mobile communication device 102, (such as an iPhone, Blackberry, or other smart phone) and the full-sized software program may be on the server computer 146 (not shown), where communications may occur over a network 104 or directly, either wired or wirelessly.

Figure 1B:
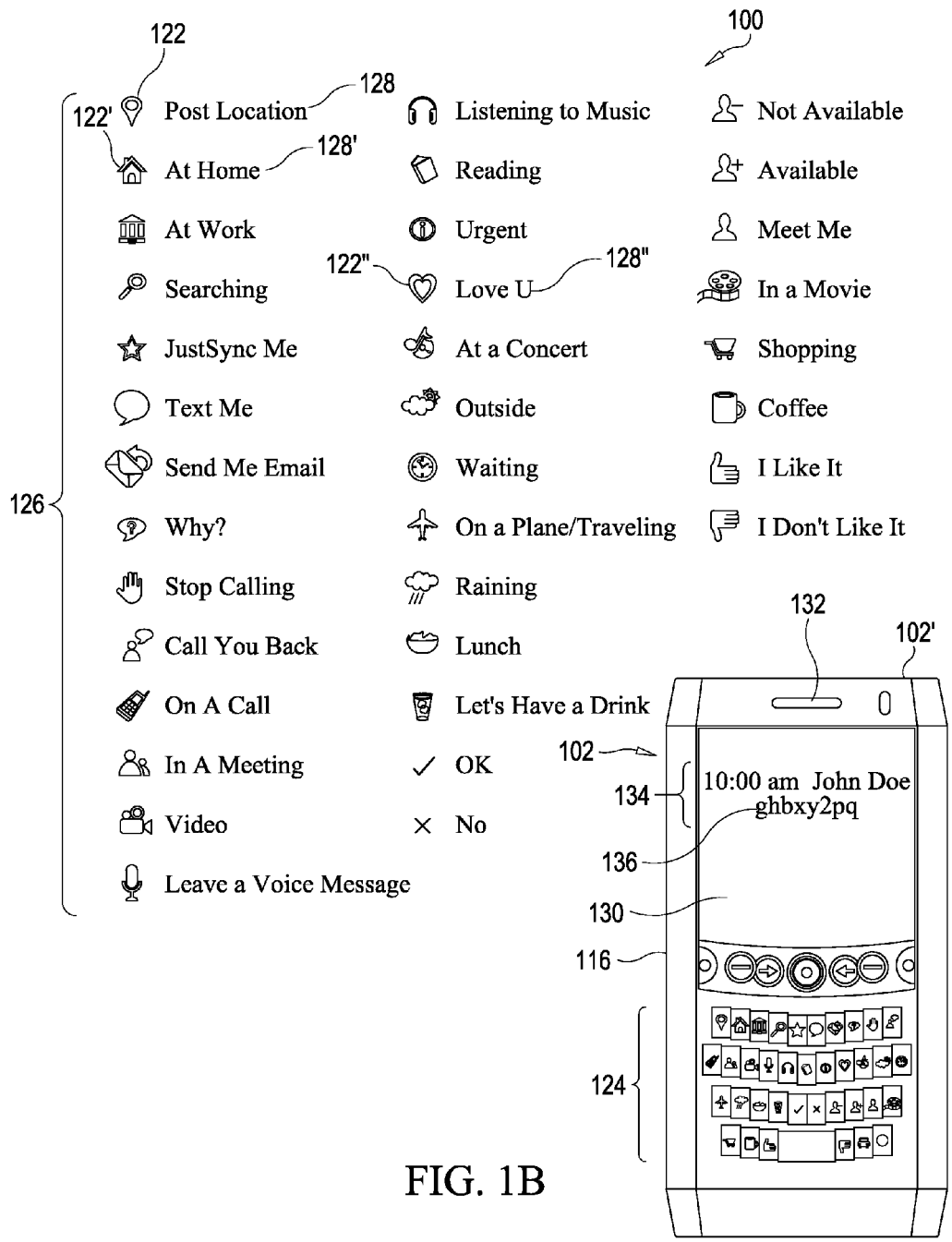

In yet another embodiment, when the code conversion app 114 is downloaded to the mobile communication device 102 from the server computer 146, the user may customize the icons 122, 122' viewable from a list 126 of icons 122, 122' or as displayed on a virtual keyboard 124 of icons 122, 122' as shown in FIG. 1B. Server computer 146 (not shown) includes but is not limited to a network enabled computer, a laptop or personal digital assistant subject to wired/wireless connectivity, which is configured with a computer processor 106'.

Code conversion app 114 is configured for receiving user supplied icons 122, 122'; converting the icons 122, 122' to decoded messages 128, 128' for transmissions to a social network feeds for posting on one or a plurality of social network 118, 118' or transmission to a second or a plurality of mobile communication devices 102', 102"; interfacing with one or more social networks 118, 118' for providing the decoded message 128 to be posted thereon; and receiving customized edits to one or more decoded messages 128,128' corresponding to one or more icons 122, 122'.

Code conversion app 114 may reside within the application manager 144 that is stored in the memory means 110, wherein the application manager 144 manages any one or more software applications stored on the mobile device 102 and the functionality of these applications, e.g. which software application needs to run in background or foreground mode and the like, or as in the case of the code conversion app 122, be able to control incoming and outgoing SMS transmissions 134.

FIG. 1B is an exemplary embodiment of the system 100 according to one embodiment. An exemplary legend for the icons 122, 122', 122" is shown in FIG. 1B for ease of reference, where each icon 122 represents a different decoded message 128, e.g. the icon 122 depicting "a pin symbol" corresponds to decoded message 128, "Post Location"; icon 122' depicting "a house," corresponds to decoded message 128', "At Home"; icon 122 showing a heart corresponds to decoded message 128" "Love U" and the like.

Figure 1C:
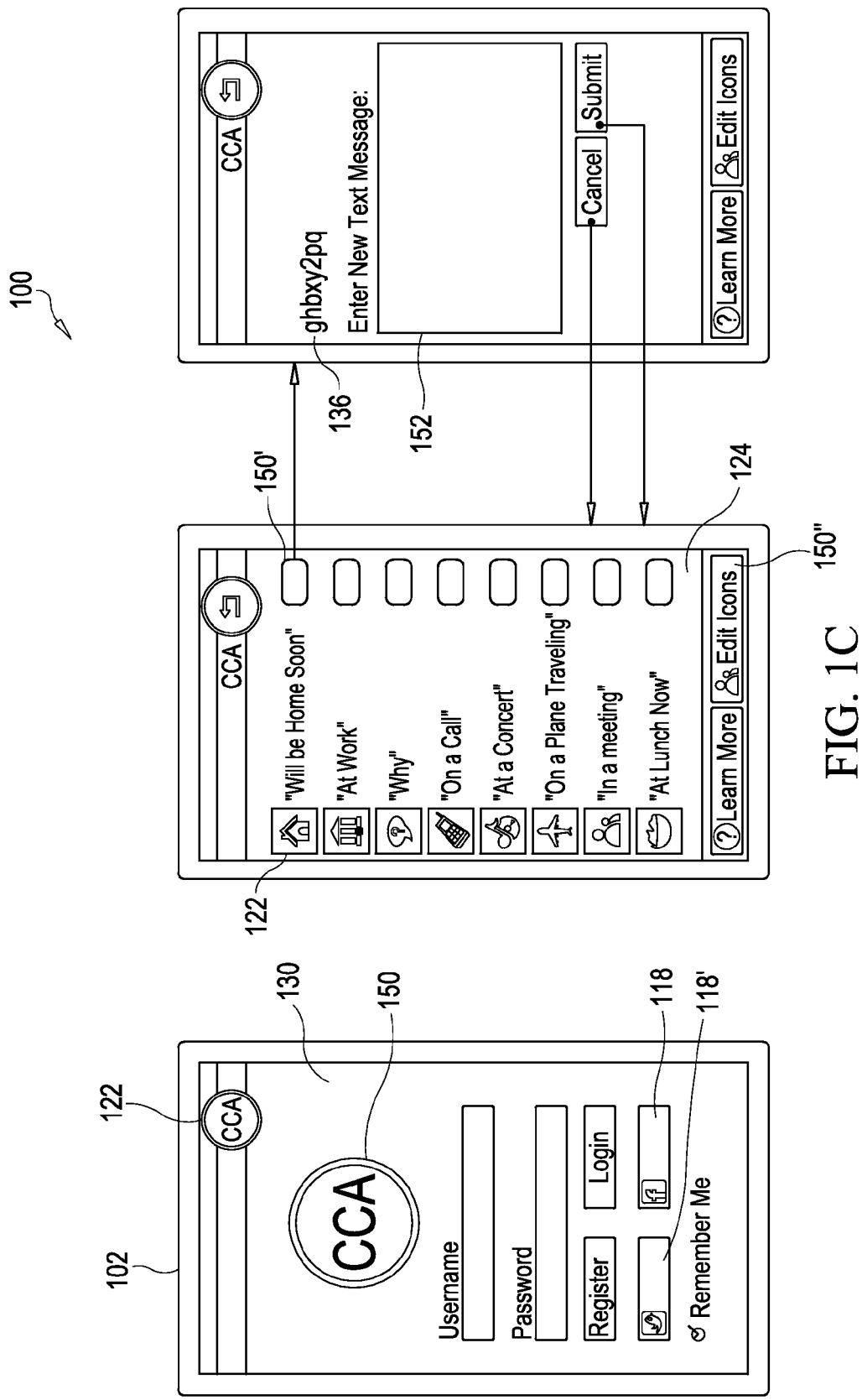
FIGS. 1C & 1D are exemplary embodiments of the system in use according to one embodiment.
Figure 1D:
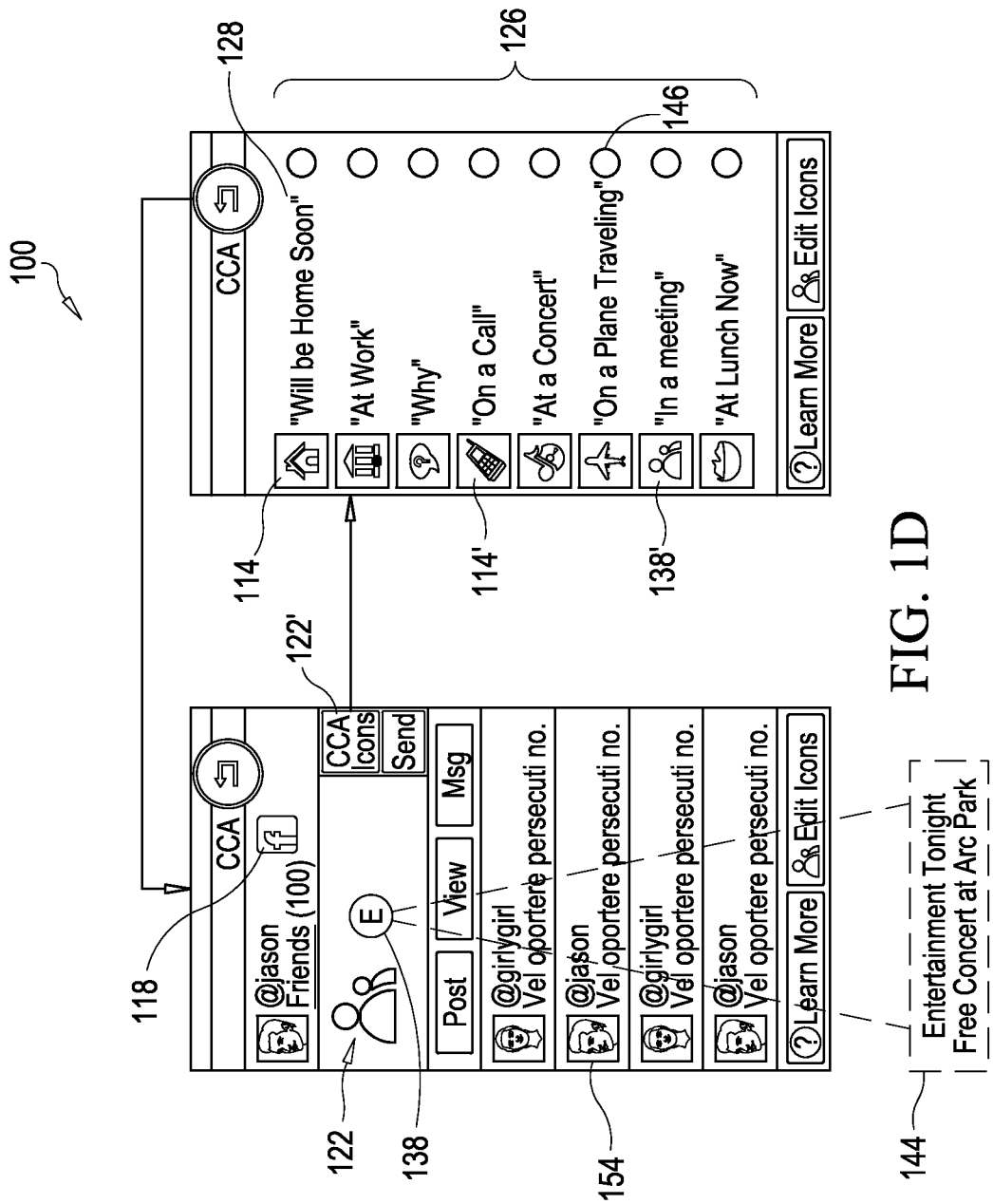

FIGS. 1C & 1D are exemplary embodiments of the system 100 in use according to one embodiment. A user may launch the code conversion app 114 via a radial button 150 or a code conversion app icon 122 such that when a user selectively activates the radial button 150 or the icon 122 (e.g., by touching a touchscreen, or selecting it using a pointing device, roller ball, arrow keys, or other controller) from a virtual keyboard 124 or list 126 of a plurality of icons 122, 122', user may use the icons 122, 122' to transmit his/her decoded message 128, 128' to a second, third, or more mobile communication devices 102', 102".

As shown in FIG. 1C, using a radial button 150, user may make a selection 120 of a coded icon 122 from a list 126 of a plurality of icons 122, 122' or from a virtual keyboard 124 of icons 122, 122', which may be confirmed prior to transmission. Code conversion app 114 receives the selection 120 of the at least one coded icon 122 corresponding to the at least one decoded message 128 for posting on the code conversion app 114 or as a link 138 reference (not shown) on the social network 118.

Illustratively as shown, user may activate or press the corresponding icon 122 or radial button 150 for decoded message, "Will Be Home Soon" for which a visible display of the decoded message 128 "Will Be Home Soon" may be converted to cryptic text 136 displayed on the mobile communication device's displaying means 112 prior to transmission to the second mobile communication device 102' or a social network 118. The posting to the social network 118 will be executed in realtime, so that conceivably other members of the code conversion app 114 or the social network 118 selected that are logged into the app 114 can see immediately in realtime the message post 152 comprising of icons 122, 122' or decoded messages 128, 128' on the user's social network wall 154. Correspondingly, users of the social network 118 are similarly notified in realtime of the new message post 152.

Icons 122, 122' may be edited using a radial button 150 programmed for opening an editor module 156 of the code conversion app 114 configured for receiving user customization, e.g. edits to decoded message 128 associated with an icon 122 as shown in FIG. 1C. User may select the icon 122 to be customized, e.g. as shown the icon 122 corresponding to the decoded message 128 "WILL BE HOME SOON", whereby code conversion app 114 may sequentially transition user to another screen where user may enter his/her customized edits to the decoded message 128 for the selected icon 122, which can be used to submit the customized decoded message 128 to one or more social network 118 feed for posting on the social network 118 and which may be saved in data elements 140 in the memory means 110 for future use of the same icon 122. For example, a priest may modify the decoded message for "AT HOME" to mean "AT CHURCH"; and a student may modify the decoded message 128 that has an icon 122 for an open book that previously corresponds to the decoded message 128 "READING" to represent "STUDYING." In this manner, the user may customize the decoded message 128 for more appropriate expressions of his/her activities and a private language communicated only to those privy to the meanings of the icons 122, 122'.

As shown in FIG. 1D, in some embodiments, user has the option of posting icons 122, 122' on the code conversion app 114, which may include a component that operates as a social network 118 site, such that authorized and unauthorized viewers alike will see the icons 122, 122' but not the decoded message 128. Except the authorized viewers more than likely will know and understand what the icons 122, 122' mean, while an unauthorized viewer more than likely will not.

In some embodiments, code conversion app 114 converts the selected at least one coded icon 122 into the corresponding decoded message 128 and generates a link 138 reference to the decoded message 128 such that the decoded message 128 is not readable as displayed on the social network 118 as it will require activation of the link 138 (by an authorized viewer) reference in order to view the decoded message 128. Code conversion app 114 transmits the link 138 reference to the at least one social network 118 feed for posting the link 138 reference in realtime to the at least one social network 118 to the extent posting is user authorized.

Methods

Figure 2:
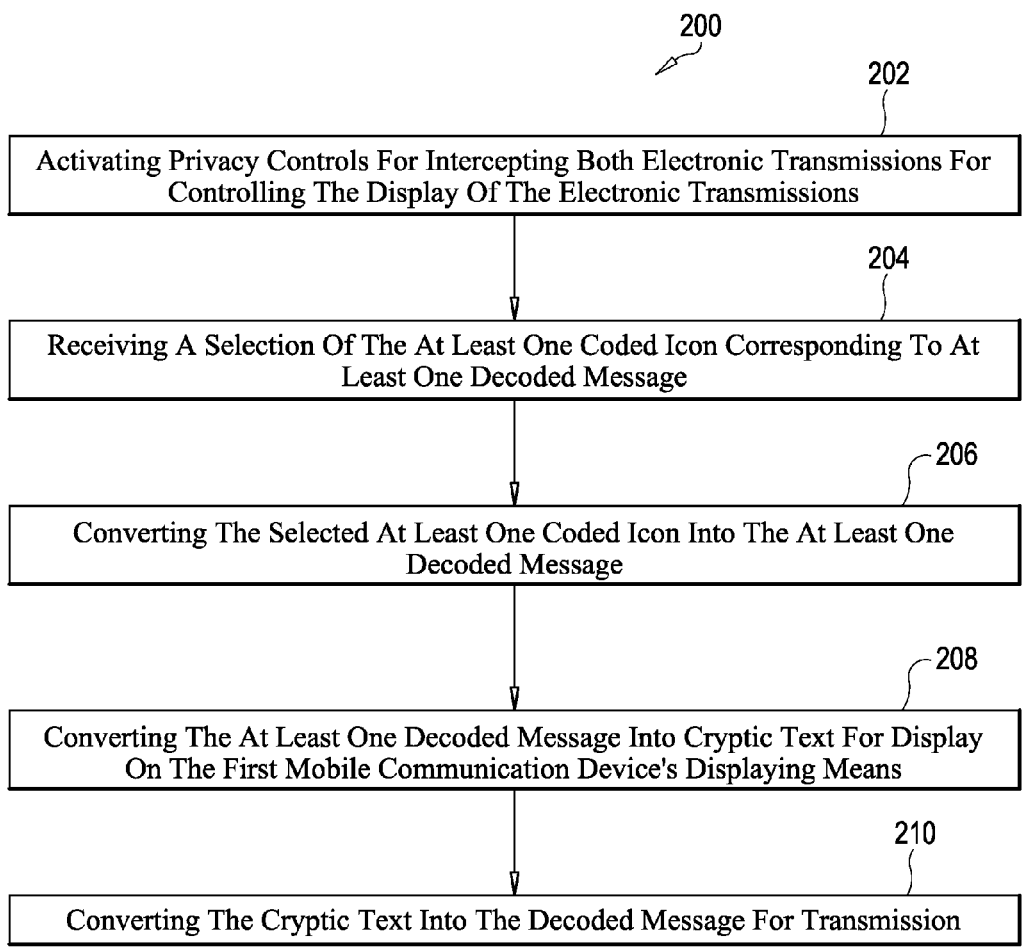
FIG. 2 is a flowchart of block diagram of an exemplary method according to one embodiment of the invention.

FIG. 2 is a sample flowchart of block diagram of an exemplary method 200 according to one embodiment of the invention. Method 200 comprises of activating privacy controls 116, 116' for a first mobile communication device 102 that includes a computer processor 106, for activating privacy controls 116, 116' for intercepting both incoming and outgoing electronic SMS transmissions 134 for controlling the display of the electronic SMS transmissions 134 (step 202).

As previously mentioned mobile communication device 102 includes any type of a network enabled computer device configured with means for communicating wirelessly and/or wired with a second, or a plurality of mobile communication devices 102", 102''', such as but not limited to, cellular phones, location-aware portable phones (such as GPS), a personal computer, server computer, or laptop, or netbook computer, PDAs, such as a Palm-based device or Windows CE device, a laptop computer, a tablet, personal computer, a portable screen, a portable processing device and/or any other portable device capable of communicating wirelessly over a computer network 104, i.e. local area network, wide area network such as the Internet, or any other type of network device that may communicate over a network 104. Processor 106 may include any type of computer processors, such as, but not limited to, a central processing unit (CPU), a microprocessor, a video processor, a front end processor, a coprocessor, a single-core processor, a multi-core processor, as well as any known computer processor 106 that's used in the arts.

Method 200 further comprises receiving a selection 120 of the at least one coded icon 122 corresponding to at least one decoded message 128 using a software application program 114, i.e. code conversion app 114, comprising computer executable instruction code 108' readable by the computer processor 106 (step 204). The software application program 114, i.e. the code conversion app 114 may be any type of software application, such as a standalone application designed to run on a mobile platform, including an OS 142, such as IOS™, ANDROID™, WINDOWS MOBILE™, BLACKBERRY™, and the like. Code conversion app 114 may be operative for an iPhone, other "smart phones", mobile communication devices, cellular phones, PDAs, GPS or any other mobile communication devices 102, 102' capable of handling transactions dealing with dynamic content, object, application, or software. In another embodiment, the app 114 may be designed to run on a social network platform, such as FACEBOOK™, TWITTER™ or JUSTSYNC™.

The code conversion app's computer executable instruction code 108 is configured for converting the selected at least one coded icon 122 into the at least one decoded message 128 (step 206); converting the at least one decoded message 128 into cryptic text 136 for display on the first mobile communication device's displaying means 139 (step 208); and converting the cryptic text 136 into the decoded message 128 for transmission (step 210).

Method 200 further comprises transmitting the at least one decoded message 128 to any one or more for the following: a second mobile communication device 102' or a social network 118, where either the decoded message 128, coded icons 122, 122' or a link 138 reference to the decoded message 128 may be displayed. If the receiving second, third, or a plurality of mobile communication devices 102' that are receiving the transmitted decoded message 128 also are configured with the code conversion app 114, method further comprises receiving the transmitted at least one decoded message 128, converting the received decoded message 128 into cryptic text 136 for display in dormant mode on the second mobile communication device's displaying means 130'; displaying the cryptic text 136 on the second mobile communication device's displaying means 130' upon receipt of the decoded message 128 and converting the cryptic text 136 into the at least one icon 122 for active viewing.

In some embodiments, based on privacy settings within the code conversion app 114, user may prevent unintended recipients from reviewing the decoded message 128 as method further comprises the code conversion app 114 being configured for displaying the cryptic text 136 on the first communication device's displaying means 130 once the SMS transmission 134 has been transmitted.

Figure 3:
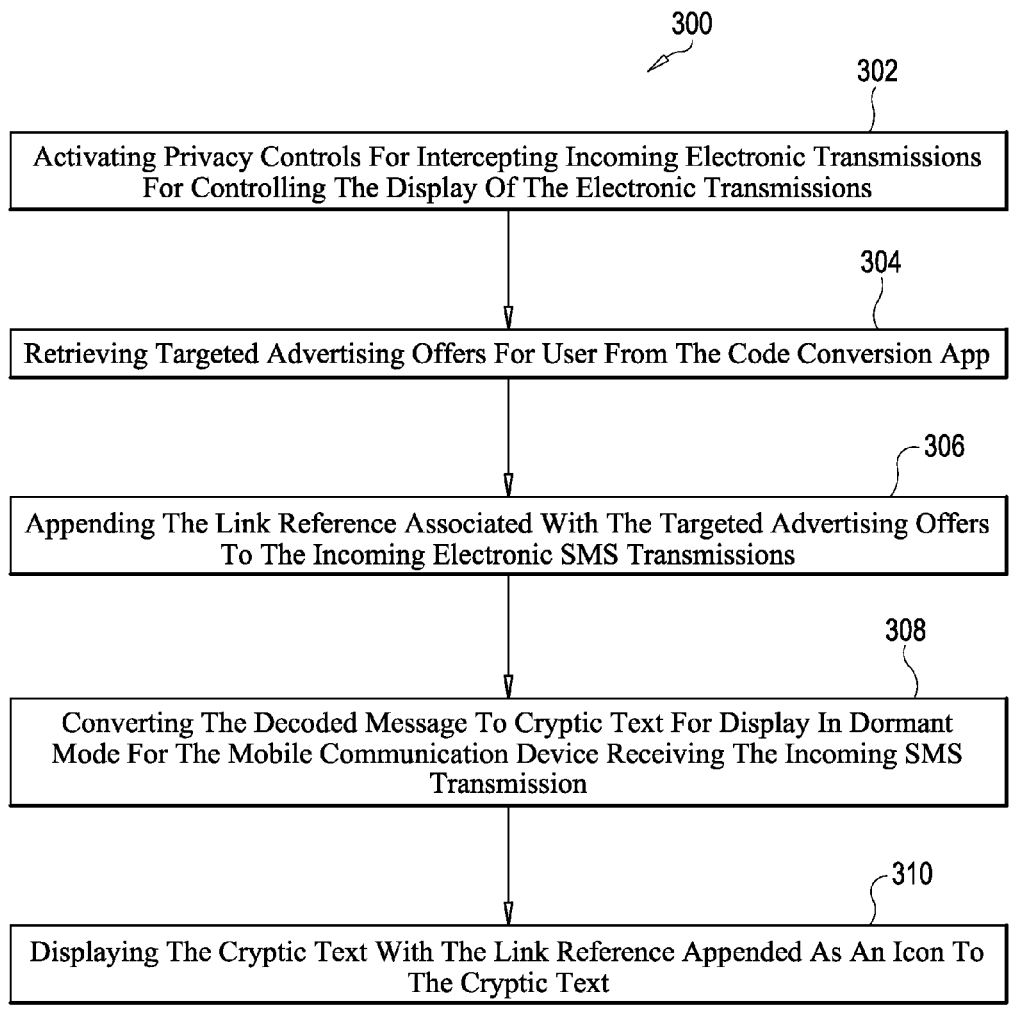
FIG. 3 is a flowchart of block diagram of an exemplary method according to one embodiment of the invention.

FIG. 3 is a flowchart of block diagram of an exemplary method 300 according to one embodiment of the invention. Method 300 comprises activating privacy controls 116 for intercepting incoming electronic SMS transmissions 136 for controlling the display of the electronic SMS transmissions 136 (step 302); retrieving targeted advertising offers 144 for user from the code conversion app 114 (step 304); appending the link 138 reference associated with the targeted advertising offers 144 to the incoming electronic SMS transmissions 136 (step 306); converting the decoded message 128 to cryptic text 136 for display in dormant mode for the mobile communication device 102 receiving the incoming SMS transmission 134 (step 308); and displaying the cryptic text 136 with the link 138 reference appended as an icon 122 to the cryptic text 136 (step 310).

Hardware and Operating Environment

This section provides an overview of example hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the system 100 and methods 200-300 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Figure 4:
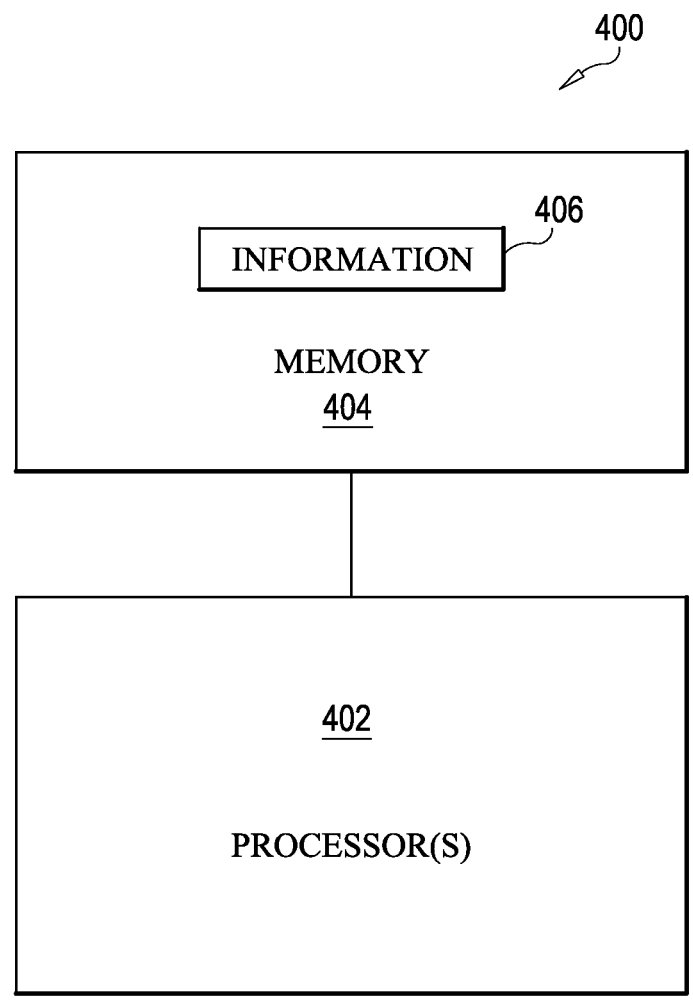
FIG. 4 is a block diagram representing an apparatus according to various embodiments.

FIG. 4 is a block diagram representing an apparatus 400 according to various embodiments. Such embodiments may comprise a computer, a memory system, a magnetic or optical disk, some other storage device, or any type of electronic device or system. The apparatus 400 may include one or more processor(s) 404 coupled to a machine-accessible medium such as a memory 402 (e.g., a memory including electrical, optical, or electromagnetic elements). The medium may contain associated information 404 (e.g., computer program instructions, data, or both) which, when accessed, results in a machine (e.g., the processor(s) 404) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising of:
a first mobile communication device that includes a computer processor comprising computer executable instruction code;
an application program comprising computer executable instruction code readable by the computer processor and configured for performing any one or more of the following:
activating privacy controls for intercepting electronic transmissions for controlling the display of the electronic transmissions;
receiving a selection of at least one coded icon corresponding to at least one decoded message;
converting the selected at least one coded icon into the at least one decoded message;
converting the at least one decoded message into cryptic text for display; and
converting the cryptic text into the decoded message for transmission.

2. The system of claim 1, wherein the computer executable instruction code is further configured for displaying the cryptic text on the first mobile communication device displaying means.

3. The system of claim 1, wherein the computer executable instruction code is further configured for transmitting the at least one decoded message to any one or more for the following: a second mobile communication device or a social network.

4. The system of claim 3, wherein the second mobile communication device comprises the application program with computer executable instruction code configured for receiving the transmitted at least one decoded message.

5. The system of claim 3, wherein the computer executable instruction code is further configured for converting the received decoded message into cryptic text for display in dormant mode on the second mobile communication device's displaying means.

6. The system of claim 3, wherein the computer executable instruction code is further configured for displaying the cryptic text on the second mobile communication device's displaying means upon receipt of the decoded message.

7. The system of claim 1, wherein the computer executable instruction code is further configured for converting the cryptic text into the at least one icon for active viewing.

8. The system of claim 1, wherein the computer executable instruction code is further configured for converting the cryptic text into the decoded message for active viewing.

9. The system of claim 1, further comprising a virtual touch-screen keyboard that comprises a plurality of coded icons that correspond to decoded messages.

10. The system of claim 9, wherein the virtual touch-screen keyboard is configured to receive the selection of at least one icon from the plurality of coded icons corresponding to the decoded messages.

11. A method comprising of:
activating privacy controls for a first mobile communication device that includes a computer processor for intercepting both electronic transmissions for controlling the display of the electronic transmissions;
receiving a selection of the at least one coded icon corresponding to at least one decoded message using an application program comprising computer executable instruction code readable by the computer processor;
converting the selected at least one coded icon into the at least one decoded message;
converting the at least one decoded message into cryptic text for display; and
converting the cryptic text into the decoded message for transmission.

12. The method of claim 11, further comprising displaying the cryptic text on the first mobile communication device displaying means.

13. The method of claim 11, further comprising transmitting the at least one decoded message to any one or more for the following: a second mobile communication device or a social network.

14. The method of claim 13, further comprising receiving the transmitted at least one decoded message.

15. The method of claim 13, further comprising converting the received decoded message into cryptic text for display in dormant mode on the second mobile communication device's displaying means.

16. The method of claim 13, further comprising displaying the cryptic text on the second mobile communication device's displaying means upon receipt of the decoded message.

17. The method of claim 11, further comprising converting the cryptic text into the at least one icon for active viewing.

18. The method of claim 11, further comprising converting the cryptic text into the decoded message for active viewing.

19. The method of claim 11, further comprising making a selection of at least one coded icon from a virtual touch-screen keyboard that comprises a plurality of coded icons that each correspond to a decoded message.

20. The method of claim 19, wherein the virtual touch-screen keyboard is configured to receive the selection of at least one icon from the plurality of coded icons corresponding to the decoded messages.

21. A method comprising:
- activating privacy controls for intercepting incoming electronic transmissions for controlling the display of the electronic transmissions;
- retrieving targeted advertising offers for user from the application program;
- appending a link reference associated with the targeted advertising offers to the incoming electronic transmissions;
- converting a decoded message to cryptic text for display in dormant mode for the mobile communication device receiving the incoming transmission; and
- displaying the cryptic text with the link reference appended as an icon to the cryptic text.

* * * * *